United States Patent [19]

Werner et al.

[11] Patent Number: 4,595,705

[45] Date of Patent: Jun. 17, 1986

[54] PROCESS FOR THE PREPARATION OF OPTIONALLY CELLULAR POLYURETHANE POLYUREA MOLDED PARTS

[75] Inventors: Frank Werner, Neustadt; Matthias Marx, Bad Durkheim; Peter Horn, Heidelberg; Hans U. Schmidt, Ludwigshafen, all of Fed. Rep. of Germany

[73] Assignee: BASF Aktiengesellschaft, Ludwigshafen, Fed. Rep. of Germany

[21] Appl. No.: 700,758

[22] Filed: Feb. 13, 1985

[30] Foreign Application Priority Data

Feb. 17, 1984 [DE] Fed. Rep. of Germany ......... 340567

[51] Int. Cl.$^4$ .................. C08G 18/14; C08G 18/30
[52] U.S. Cl. .................. 521/51; 428/318.8; 521/172; 521/173; 528/83
[58] Field of Search .................. 521/51, 172, 173; 528/83; 428/318.8

[56] References Cited

U.S. PATENT DOCUMENTS

| | | | |
|---|---|---|---|
| 3,794,621 | 2/1974 | Meckel et al. | 528/83 |
| 4,218,543 | 8/1980 | Weber et al. | 521/129 |
| 4,246,363 | 1/1981 | Turner et al. | 521/163 |
| 4,341,875 | 7/1982 | Visger et al. | 521/164 |
| 4,444,910 | 4/1984 | Rice et al. | 521/51 |
| 4,508,774 | 4/1985 | Grabhoefer et al. | 428/220 |

*Primary Examiner*—Herbert S. Cockeram
*Attorney, Agent, or Firm*—William G. Conger; Joseph D. Michaels

[57] ABSTRACT

The invention relates to a one-shot process for the preparation of cellular or noncellular polyurethane polyurea parts having a modulus of flexural elasticity greater than 600 N/mm$^2$ and densities of from 0.8 to 1.2 g/cm$^3$ using the reaction injection molding technique, by reacting organic polyisocyanates, a polyol component, aromatic diamines, additional chain extenders and/or cross-linking agents in the presence of catalysts and optionally blowing agents, auxiliaries and/or additives, wherein the polyol component is a mixture containing (i) from 95 to 60 percent by weight of at least one compound selected from the group consisting of polyols, polyether polyamines, polyesteramides, and their mixtures having functionalities of from 2 to 6 and a molecular weight of from 1000 to 8000 and (ii) from 5 to 40 percent by weight of a least one aromatic and/or aromatic-aliphatic polyester polyol having a functionality of from 2 to 3 and a molecular weight of from 254 to 700, wherein the percents by weight are based on the total weight of the polyol component.

9 Claims, No Drawings

PROCESS FOR THE PREPARATION OF OPTIONALLY CELLULAR POLYURETHANE POLYUREA MOLDED PARTS

BACKGROUND OF THE INVENTION

1. Field of the Invention

The subject invention relates to polyurethane polyurea polymers which are prepared by one-shot reaction injection molding (RIM). More particularly, the invention relates to the preparation of molded parts by the RIM process wherein flexural moduli greater than 600 N/mm$^2$ is achieved through the use of a novel polyol component mixture.

2. Description of Related Art

Federal Republic of Germany published application 11 96 864 (U.S. Pat. No. 3,099,516) discloses the preparation of cross-linked plastics using isocyanate addition polymerization wherein hydroxyl group-containing compounds and polyisocyanates are expanded in molds in the presence of blowing agents and catalysts.

By correctly selecting the hydroxyl group-containing polyesters, polyethers, polyesteramides, etc. and the organic polyisocyanates and in addition using chain extenders such as glycols or diamines, this method can be used to produce both elastic and rigid polyurethanes as well as modifications between these extremes.

Federal Republic of Germany Pat. No. 831 604 (U.S. Pat. No. 2,778,810) discloses the preparation of polyurethane elastomers from hydroxyl group-containing compounds and polyisocyanates by first preparing isocyanate group-containing prepolymers, which are then reacted in a second step with chain extenders to form higher molecular weight elastomers.

The use of diamines as chain extenders generally prohibited the use of a one-shot process for the preparation of polyurethane polyurea polymers. As disclosed in Federal Republic of Germany published application No. 11 49 523 (U.S. Pat. No. 3,105,062), crystalline, aromatic primary diamines are incorporated in the liquid, isocyanate group-containing prepolymers in less than the stoichiometric amount relative to the isocyanate groups, at a temperature less than the melting point of the diamines. The resulting mixtures are then cured by the application of heat. In Federal Republic of Germany Pat. No. 12 40 654 (U.S. Pat. No. 3,428,610), the isocyanate group-containing prepolymers are reacted at room temperature or moderately elevated temperatures with liquid or dissolved aromatic diamines which contain at least 1 linear alkyl substituent in the ortho position relative to the first amino group and two linear alkyl substituents having from 1 to 3 carbon atoms on the second amino group.

A process for the preparation of optionally cellular, elastic molded parts having a closed skin from polyurethane polyurea elastomers using the principle of reaction injection molding (RIM) is described in Federal Republic of Germany published application No. 26 22 951 (U.S. Pat. No. 4,218,543). The systems cited therein consist primarily of organic polyisocyanates, polyols, and reactive di- or polyamine chain extenders substituted by alkyl groups in the ortho position relative to the amino group. Strong catalysts for the reaction between the hydroxyl and isocyanate groups are present. In this process it is essential that the aromatic di- or polyamines are miscible in all proportions with polyols having molecular weights from 1200 to 1800. Furthermore, it is essential that the alkyl substituents must have from 1 to 3 carbon atoms; at least two of the alkyl substituents have from 2 to 3 carbon atoms; and each of the ortho positions relative to the amino groups must be substituted. Such systems may possess cream times of less than one second. With these low cream times, the transition from liquid to solid phase takes place almost instantaneously, which causes the liquid reaction mixture to solidify uniformly on the walls of the molds.

It is also known that the reactivity of aromatic amino groups can be sharply reduced relative to isocyanates through the use of electrophilic substituents. Examples of such aromatic diamines, as cited in Federal Republic of Germany Pat. No. 12 16 538 (British Pat. No. 981,935), are 3,3'-dichloro-4,4'-diaminodiphenylmethane, 3,3'-dinitro-4,4'-diaminodiphenylmethane and 3,3'-dichloro-4,4'-diaminodiphenyl. The use of such compounds is subject to expensive handling restrictions based on health and safety regulations. The use of the highly electronegative substituents in these compounds, however, reduces the reactivity of the aromatic amino groups to such a large extent that curing of the reaction injection molded parts can require up to 15 minutes, thereby making the use of this process uneconomical.

Polyurethane polyurea formulations having reduced reactivity and therefore improved flowability compared to systems prepared in accordance with Federal Republic of Germany published application No. 26 22 951 are disclosed in the specifications of European published application No. 26 915. According to this process, 3,3',5,5'-tetraalkyl substituted 4,4'-diaminodiphenylmethanes in which the alkyl radicals are the same or different and represent a methyl, ethyl, isopropyl, sec- or tert-butyl radical, and wherein at least 1 of the substituents must be an isopropyl or sec-butyl radical are used as the aromatic diamines. The tetraalkyl-substituted diaminodiphenylmethanes mix quite well with the polyols in the required amounts at room temperature and exhibit only slight or even no tendency to crystallize, so that the formulations are easily handled under the standard conditions for conventional RIM systems. However, it has also been found that the tetraalkyl-substituted 4,4'-diaminodiphenylmethanes may not be reactive enough for some applications.

Somewhat more reactive polyurethane polyurea formulations are described in European published application No. 69 286. Trialkyl-substituted metaphenylenediamines are used as the aromatic diamines, wherein two of the alkyl substituents may be the same or different and are linear or branched alkyl radicals having from 1 to 4 carbon atoms while the third alkyl radical has from 4 to 12 carbon atoms or is a 5- or 6-membered cycloalkyl radical. Even with a relatively high diamine content, the formulations exhibit sufficient flowability and produce molded parts which have high dimensional stability at elevated temperature, and which do not exhibit progressive drop in their shear modulus curves between 100° C. and 200° C.

Despite the large number of processes for preparing polyurethane polyurea polymers, not all of the desirable commercial requirements have been met relative to such parameters as formulation processability and physical properties of the resulting products. Formulations containing highly reactive aromatic diamines have the disadvantage, for example, that they produce molded parts which exhibit only rigidity. values of the modulus of flexural elasticity of up to approximately 600 N/mm$^2$ may be achieved by these processes. Attempts to increase the flexural modulus by further increases in the diamine content cause the molded parts to become brittle.

SUMMARY OF THE INVENTION

The object of the subject invention is a polyurethane polyurea formulation which may be processed as a one-shot system using the reaction injection molding technique to yield molded parts having modulus of flexural elasticity greater than 600 N/mm$^2$. This objective was unexpectedly met by a process for the preparation of cellular or noncellular polyurethane polyurea molded parts through the reaction of organic polyisocyanates, polyol component, aromatic diamines and, in some cases, additional chain extenders and/or crosslinking agents in the presence of catalysts, blowing agents, auxiliaries and additives, wherein the improvement comprises using as the polyol component, mixtures of (i) a conventional polyol selected from the group consisting of polyester polyols, polythioether polyols, polyacetal polyols, polycarbonate polyols, polyether polyols, polyether polyamines, polyesteramides, and their mixtures, wherein said polyols have a functionality of from 2 to 6 and a molecular weight of from 1000 to 8000 and (ii) an aromatic polyol selected from the group consisting of aromatic polyester polyols, aromatic-aliphatic polyester polyols, and mixtures thereof, wherein said aromatic polyol has a functionality of from 2 to 3 and a molecular weight of from 254 to 700.

The polyurethane polyurea molded parts produced by the process of the invention have moduli of flexural elasticity greater than 600 N/mm$^2$ and comparable values for the remaining physical properties.

DESCRIPTION OF THE PREFERRED EMBODIMENTS

Typical organic polyisocyanates used in the process of the subject invention are aliphatic, cycloaliphatic, araliphatic, and preferably aromatic polyfunctional isocyanates. Specific example are: alkylene diisocyanates having from 4 to 12 carbon atoms in the alkylene radical such as 1,12-dodecane diisocyanate, 1,4-tetramethylene diisocyanate, and preferably 1,6-hexamethylene diisocyanate; cycloaliphatic diisocyanates, such as 1,3- and 1,4-cyclohexane diisocyanate and their mixtures, 1-isocyanato-3,3,5-trimethyl-5-isocyanatomethylcyclohexane (isophorone diisocyanate), 2,4- and 2,6-hexahydrotoluene diisocyanate and their mixtures, 4,4'-, 2,2'- and 2,4'-dicyclohexylmethane diisocyanate and their mixtures; and preferably, aromatic di- and polyisocyanates such as 4,4'-, 2,4'- and 2,2'-diisocyanatodiphenylmethane and their mixtures, 2,4- and 2,6-diisocyanatotoluene and their mixtures, 1,5-diisocyanatonaphthalene, polyphenyl-polymethylene polyisocyanates, 2,4,6-triisocyanatotoluene, and preferably mixtures of diphenylmethane diisocyanates and polyphenyl polymethylene polyisocyanates (polymeric MDI). These di- and polyisocyanates can be used individually or in the form of mixtures.

Frequently, modified polyfunctional isocyanates are used. Typical modified organic di- and polyisocyanates are: carbodiimide group-containing polyisocyanates in accordance with Federal Republic of Germany Pat. No. 10 92 007; allophanate group-containing polyisocyanates, for example those described in British Pat. No. 994,890, the references disclosed in Belgian Pat. No. 671,626, and in Dutch published application No. 71 02 524; isocyanurate group-containing polyisocyanates such as those described in Federal Republic of Germany Pat. Nos. 10 22 789, 12 22 067, 10 27 394 and Federal Republic of Germany published application Nos. 19 29 034, and 20 04 048; urethane group-containing polyisocyanates such as those described in the references cited in Belgian Pat. No. 752,261, or as described in U.S. Pat. No. 3,394,164; acylated urea group-containing polyisocyanates such as those described in Federal Republic of Germany Pat. No. 12 30 778; biuret group-containing polyisocyanates such as those described in Federal Republic of Germany Pat. No. 11 01 394 and British Pat. No. 889 050; polyisocyanates prepared by means of telomerization reactions as described in the references in Belgian Pat. No. 723,640; ester group-containing polyisocyanates as disclosed in British Pat. Nos. 965,474 and 1,072,956, in U.S. Pat. No. 3,567,765, and in Federal Republic of Germany Pat. No. 12 31 688.

Preferably though, the following are used: urethane group-containing polyisocyanates such as those prepared from isocyanates such as 4,4'- and/or 2,4'-diphenylmethane diisocyanate or toluene diisocyanate or 2,4- and/or 2,6-toluene diisocyanate by reaction with low molecular weight linear or branched alkanediols, dialkylene glycols, or polyoxyalkylene glycols having molecular weight of up to 800 prepared from ethylene oxide, 1,2-propylene oxide, or their mixtures; carbodiimide group- and/or isocyanurate ring-containing polyisocyanates, for example those derived from 4,4'-, 2,4'-diphenylmethane diisocyanate, 2,4- and/or 2,6-toluene diisocyanate, and, preferably, 4,4'-diphenylmethane diisocyanate, mixtures of 2,4'- and 4,4'-diphenylmethane diisocyanate, toluene diisocyanates, mixtures of diphenylmethane diisocyanates and polyphenyl polymethylene polyisocyanates (polymeric MDI) and mixtures of toluene diisocyanates and polymeric MDI.

The polyol utilized by the subject invention is a special mixture which component contains both conventional polyurethane polyols having molecular weights from 1000 to 8000, and aromatic polyester polyols having a functionality of 2 to 3 and a molecular weight from 254 to 700.

As the conventional polyol component, (i) may be used one or more compounds from the group consisting of polythioether polyols, hydroxyl group-containing polyacetals, hydroxyl group-containing aliphatic polycarbonates, and preferably, polyether polyols, polyester polyols, polyether polyamines, polyesteramides, or their mixtures, wherein these conventional polyols have functionalities of from 2 to 6, preferably from 2 to 4, and molecular weights of from 1000 to 8000, preferably from 1800 to 4000.

As the aromatic polyol, (ii) are used at least one aromatic polyester polyol, aromatic-aliphatic polyester polyol or mixture thereof, having a functionality of from 2 to 3, preferably 2, and a molecular weight of from 254 to 700, preferably from 260 to 500.

Particularly suited and therefore preferably used are mixtures containing from 95 to 60 percent by weight, preferably from 90 to 75 percent by weight of a conventional polyol component (i), preferably polyether polyols, polyester polyols, polyether polyamines and polyesteramides. Especially preferred are polyether and polyester polyols.

The polyol, in addition to the conventional polyol (i), contains from 5 to 40 percent by weight, preferably from 10 to 25 percent by weight of an aromatic polyol (ii) which may be an aromatic-aliphatic polyester polyol, or preferably, an aromatic polyester polyol or their mixtures. The percents by weight of the polyol components are based on the total weight of (i) and (ii) wherein components (i) and (ii) have the functionalities and molecular weights cited above.

As the conventional polyol, polyester polyols may be used. Suitable polyester polyols can be prepared, for example, from organic dicarboxylic acids having from 2 to 12 carbon atoms, preferably aliphatic dicarboxylic acids having from 4 to 6 carbon atoms, and polyfunctional alcohols, preferably diols having from 2 to 12 carbon atoms, more preferably from 2 to 6 carbon atoms. Typical dicarboxylic acids are: succinic acid, glutaric acid, adipic acid, suberic acid, azelaic acid, sebacic acid, decane dicarboxylic acid, maleic acid, and fumaric acid. The dicarboxylic acids may be used individually or in mixtures with one another. Instead of the free dicarboxylic acids, corresponding dicarboxylic acid derivatives may also be used, for example dicarboxylic acid esters of alcohols having from 1 to 4 carbon atoms, or dicarboxylic anhydrides. Preferably used are dicarboxylic acid mixtures of succinic acid, glutaric acid, and adipic acid, in proportions of 20–35:35–50:20–32 parts by weight, and in particular adipic acid. Examples of di- and polyfunctional alcohols, in particular, diols, are: ethanediol, diethylene glycol, 1,2- and 1,3-propanediol, dipropylene glycol, 1,4-butanediol, 1,5-pentanediol, 1,6-hexanediol, 1,10-decanediol. Examples of triols are glycerin and trimethylolpropane. Preferably used are ethanediol, diethylene glycol, 1,4-butanediol, 1,5-pentanediol, 1,6-hexanediol, or mixtures of two or more of the cited diols, preferably mixtures of 1,4-butanediol, 1,5-pentanediol, and 1,6-hexanediol. In addition, polyester polyols from lactones, for example ε-caprolactone, or hydroxycarboxylic acids for example ω-hydroxycaproic acid may be used. The polyester polyols preferably have a functionality of from 2 to 3 and a molecular weight of from 1000 to 3000, more preferably from 1800 to 2500.

The preferred polyols for use as the conventional polyol in the process of the subject invention are the polyether polyols. These polyols are prepared through anionic polymerization using alkali hydroxides such as sodium or potassium hydroxide, or alkali alkoxides such as sodium methoxide, sodium or potassium ethoxide, or potassium isopropoxide as catalysts. They may also be prepared by cationic polymerization with Lewis acids such as antimony pentachloride, boron trifluoride etherate, or bleaching earth as catalyst. Generally, one or more cyclic ethers having from 2 to 4 carbon atoms, and an initiator containing from 2 to 8, preferably 2 to 4, reactive hydrogen atoms are utilized in the preparation of these polyethers.

Suitable cyclic ethers are, for example: tetrahydrofuran, and alkylene oxides such as 1,3-propylene oxide, 1,2- and 2,3-butylene oxide, styrene oxide, and epichlorohydrin. Preferably ethylene oxide and 1,2 propylene oxide are utilized. The alkylene oxides may be used individually, alternately one after another, or as mixtures.

Typical initiator molecules are: water, organic dicarboxylic acids such as succinic acid, adipic acid, phthalic acid, and terephthalic acid; aliphatic and aromatic optionally N-mono, N,N- and N,N'-dialkyl-substituted diamines having from 1 to 4 carbon atoms in the alkyl radical such as mono- and dialkyl-substituted ethylenediamine, diethylenetriamine, triethylenetetramine, 1,3-propylenediamine, 1,3- or 1,4-butylenediamine, 1,2- 1,3-1,4-, 1,5-, 1,6-hexamethylenediamine, phenylenediamines, 2,4- and 2,6-toluenediamine, and 4,4'-, 2,4'- and 2,2'-diaminodiphenylmethanes.

Alkanolamines may also be used as the initiators, for example ethanolamine, diethanolamine, N-methyl- and N-ethylethanolamine, N-methyl- and N-ethyldiethanolamine and triethanolamine, ammonia, hydrazine and hydrazides. Preferably polyfunctional, and more preferably, di- and/or trifunctional alcohols are used: for example ethanediol, 1,2- and 1,3-propanediol, diethylene glycol, dipropylene glycol, 1,4-butanediol, 1,6-hexanediol, glycerin, trimethylolpropane, pentaerythritol, and sorbitol.

These preferred polyether polyols possess molecular weights from 1000 to 8000, preferably from 1200 to 6000 and more preferably from 1800 to 4000. As with the polyester polyols, they may be used individually or in the form of mixtures. In addition, they may be mixed with polyester polyols as well as with hydroxyl group-containing polyesteramides, polyacetals, polycarbonates, and/or polyether polyamines.

Typical hydroxyl group-containing polyacetals are those compounds which may be prepared from glycols such as diethylene glycol, triethylene glycol, 4,4'-dihydroxyethoxydiphenyldimethylmethane, Ehexanediol and formaldehyde. Suitable polyol acetals may also be prepared through the polymerization of cyclic acetals.

The hydroxyl group-containing polycarbonates which may be used are those of the known type, which may be prepared through the reaction of diols such as 1,3-propanediol, 1,4-butanediol, and/or 1,6-hexanediol, diethylene glycol, triethylene glycol, or tetraethylene glycol, with diarylcarbonates such as diphenylcarbonate, or with phosgene.

Among the polyesteramides are those which, for example are obtained from polyfunctional saturated and/or unsaturated carboxylic acids or their anhydrides, and polyfunctional saturated and/or unsaturated amino alcohols or mixtures of polyfunctional alcohols and amino alcohols and/or polyamides. Preferably linear polyesteramides are utilized.

Suitable polyether polyamines may be prepared from the polyether polyols cited above using known methods. Typical examples are the cyanoalkylation of polyoxyalkylene polyols and the subsequent hydrogenation of the nitrile which is formed (U.S. Pat. No. 3,267,050) or the amination of the polyoxyalkylene polyols with amines or ammonia in the presence of hydrogen and catalysts (Federal Republic of Germany Pat. No. 12 15 373).

In addition to the conventional polyol (i) is used an aromatic polyol (ii). The aromatic-aliphatic and aromatic polyester polyols which compose this aromatic polyol component may be prepared by the polycondensation of aromatic dicarboxylic acids or dicarboxylic acid derivatives, for example aromatic dicarboxylic acid anhydrides or aromatic diesters, with aliphatic diols and/or triols. The dicarboxylic acid or dicarboxylic acid derivative may optionally contain some aliphatic dicarboxylic acids or their derivatives as well. When aromatic-aliphatic polyester polyols are used, it is essential that the aromatic dicarboxylic acids or their derivatives predominate. In other words the aromatic-aliphatic polyesters should contain from 50 to 99 percent by weight, preferably from 60 to 90 percent by weight, of condensed aromatic dicarboxylic acid esters. Suitable aromatic dicarboxylic acids are: terephthalic acid, isophthalic acid, and preferably, phthalic acid, which may be used individually or in the form of their mixtures. These aromatic dicarboxylic acids may be mixed with saturated or ethylenically unsaturated dicarboxylic acids such as succinic, glutaric, adipic, suberic, maleic, and/or fumaric acid to prepare the aromatic-aliphatic polyester polyols. Diols and triols which have been used successfully are, for example: ethanediol, diethylene glycol, 1,4-butanediol, neopentyl glycol, 1,6hexanediol, 1,3- and 1,2-propropanediol, dipropylene glycol, triethylene glycol, tetraethylene glycol, glycerin, trimethylolpropane and triethylolpropane. Preferably used are those aromatic polyester polyols prepared from phthalic acid and ethylene glycol and/or diethylene glycol. The aromatic or aromatic-alphatic polyester polyols which may be used in accordance with the invention have molecular weights of from 254 to 700, preferably from 260 to 500, and functionalities of 2 or 3, preferably 2. These aromatic polyols have acid numbers less than 3, more preferably from 0.3 to 2, and corresponding to the molecular weight range and functionality, have hydroxyl numbers from 160 to 442, preferably from 220 to 430. The aromatic or aromatic-aliphatic polyester polyols may be used individually or in the form of mixtures. The aromatic polyols (ii) may be present either partially or completely dissolved or in dispersed form in admixture with the conventional polyol component (i).

Primary aromatic diamines are used as the aromatic diamines in the process of the invention. Preferably used are aromatic diamines whose primary amino groups do not exhibit a reduced reactivity to the polyisocyanates caused by electrophilic substituents. Preferably such aromatic diamines contain primary amino groups which are sterically hindered. Particularly suited are primary aromatic diamines which are liquid at room temperature and which are partially or completely miscible with the polyol component under the processing conditions. For example, success has been achieved with meta-phenylenediamine and preferably, alkyl-substituted meta-phenylenediamines of formulas

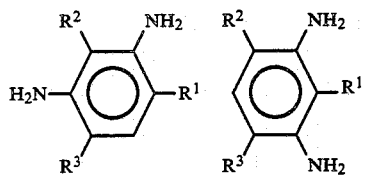

In which $R^1$ is a hydrogen atom or a linear or branched alkyl radical having from 1 to 12, preferably 1 to 6 carbon atoms, and $R^2$ and $R^3$ are identical or different alkyl radicals having from 1 to 3 carbon atoms, for example methyl, ethyl, propyl, or isopropyl radicals.

Particularly suitable are those branched alkyl radicals $R^1$ in which the branching point is located at the $C_1$ carbon atom. In addition to hydrogen, the following typical alkyl radicals $R^1$ may be cited: methyl, ethyl, n- and isopropyl, butyl, hexyl, octyl, decyl, 1-methyloctyl, 2-ethyloctyl, 1-methylhexyl, 1,1-dimethylpentyl, 1,3,3-trimethylhexyl, 1-ethylpentyl, 2-ethylpentyl, and preferably the cyclohexyl, 1-methyl-n-propyl, tert-butyl, 1-ethyl-n-propyl, 1-methyl-n-butyl, and 1,1-dimethyl-n-propyl radical.

Typical alkyl substituted m-phenylenediamines are: 2,4-dimethyl-, 2,4-diethyl-, 2,4-diisopropyl-, 2,4-diethyl-6-methyl-, 2-methyl-4,6-diethyl-, 2,4,6-triethyl-, 2,4-dimethyl-6-cyclohexyl-, 2-cyclohexyl-4,6-diethyl-, 2-cyclohexyl-2,6-diisopropyl-, 2,4-dimethyl-6-(1-ethyl-n-propyl)-, 2,4-dimethyl-(1,1-dimethyl-n-propyl)-, and 2-(1-methyl-n-butyl)-4,6-dimethyl-1,3-phenylenediamines.

In addition, alkyl-substituted diaminodiphenylmethanes, have also proven to be successful, for example, 3,3'-di- and 3,3',5,5'-tetra-n-alkyl substituted 4,4'-diaminodiphenylmethanes such as 3,3'-diethyl-, 3,3',5,5'-tetraethyl- and 3,3',5,5'-tetra-(n-propyl)-4,4'-diaminodiphenylmethane.

Preferably used are diaminodiphenylmethanes of formula

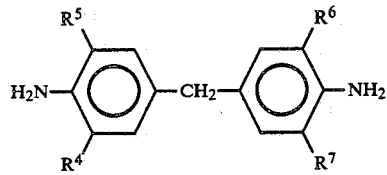

in which $R^4$, $R^5$, $R^6$ and $R^7$ are the same or different and may represent ethyl, propyl, isopropyl, sec-butyl, or tert-butyl radicals, whereby at least 1 of the radicals must be an isopropyl or sec-butyl radical. The alkyl-substituted 4,4'-diaminodiphenylmethanes can also be used as mixtures with isomers having formulas

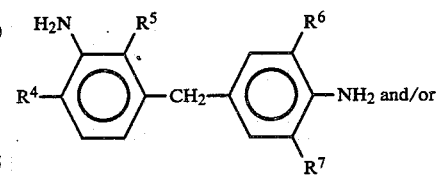

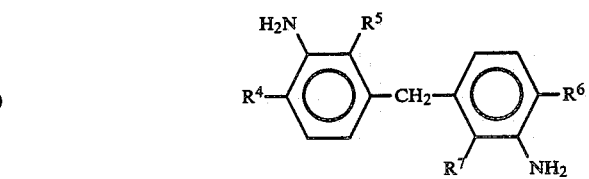

where $R^4$, $R^5$, $R^6$, and $R^7$ have the meaning stated above.

Typical examples are: 3,3',5-trimethyl-5'-isopropyl-3,3',5-triethyl-5'-isopropyl-3,3',5- trimethyl-5'-sec-butyl-, 3,3',5-triethyl-5'-sec-butyl-4,4'-diaminodiphenylmethanes. 3,3'-dimethyl-5-5'-diisopropyl-, 3,3'-diethyl-5,5'-diisopropyl-, 3,3'-dimethyl-5,5'-bis(sec-butyl)-, 3,3'-diethyl-5,5'-bis(sec-butyl)-, 3,5-dimethyl-3',5'-diisopropyl-, 3,5-diethyl-3',5'-diisopropyl-, 3,5-dimethyl-3',5'-bis(sec-butyl)-3,5-diethyl-3',5'-bis(sec-butyl)-4,4'-diaminodiphenylmethanes. 3-methyl-3',5,5'triisopropyl-, 3-ethyl-3',5,3-methyl-3',5'-triisopropyl-,5,5'-tri-sec-butyl-, 3-ethyl-3',5,5'-tris(sec-butyl)-4,4'-diaminodiphenylmethane, 3,3'-diisopropyl-5,5'-bis(sec-butyl)-3,5-diisopropyl-, 3,5'-bis(sec-butyl)-, 3-ethyl-5-sec-butyl-3',5'-diisopropyl-, 3-methyl-5-tert-butyl-3 ',5'-diisopropyl-, 3-ethyl-5-sec-butyl-3'-methyl-5'-tertbutyl-, 3,3',5,5'-tetraisopropyl- and 3,3',5,5'-tetrakis(sec-butyl)-4,4'-diaminodiphenylmethane.

The following primary aromatic diamines are preferably used: 2,4-diethyl-, 2,4-dimethyl-1,3-phenylenediamines; 2,4-diethyl-6-methyl-, 2-methyl-4,6-diethyl-1,3-phenylenediamines; 2,4,6-triethyl-1,3-phenylenediamine; 2,4-dimethyl-6-tert-butyl-, 2,4-dimethyl-6-isooctyl-, and 2,4-dimethyl-6-cyclohexyl-1,3-phenylenediamine, 3,5-dimethyl-3′,5′-diisopropyl-and 3,3′,5,5′-tetraisopropyl-4,4′-diaminodiphenylmethane.

The primary aromatic diamines can be utilized individually or in the form of mixtures, for example mixtures of alkyl-substituted 1,3-phenylenediamines, 3,3′-di- and/or 3,3′,5,5′-tetraalkyl-substituted 4,4′-diaminodiphenylmethanes. In addition, the primary aromatic diamines can be mixed with a maximum of 50 percent by weight, based on the total weight of the aromatic diamine component, of primary alkyl-substituted aromatic tri- to pentamines, such as polyphenyl polymethylene polyamines, wherein the aromatic polyamines are substituted with an alkyl radical in at least one ortho position relative to the amino groups.

The primary aromatic diamines or their mixtures may be used in the process of the invention in amounts of from 5 to 150 parts by weight, preferably from 8 to 100 parts by weight, and more preferably from 10 to 80 parts by weight based on 100 parts by weight of the polyol component.

In some instances it may be desirable, especially when preparing cellular polyurethane polyurea molded parts, to partially replace the primary aromatic diamines with chain extenders and/or cross-linking agents, hereinafter referred to merely as chain extenders. The chain extenders preferably have molecular weights less than 500, more preferably from 30 to 400, and they preferably have two active hydrogen atoms. Typical examples are aliphatic and/or araliphatic diols having from 2 to 14, preferably from 2 to 6 carbon atoms, such as 1,3-propanediol, 1,10-decanediol, diethylene glycol, dipropylene glycol, bis-[2-hydroxyethyl]hydroquinone, and preferably ethylene glycol, 1,4-butanediol, and 1,6-hexanediol, triols such as glycerin and trimethylolpropane, low-molecular-weight polyoxyalkylene polyols based on ethylene and/or 1,2-propylene oxide, and the previously noted initiators and sec-aromatic diamines, of which typical examples are: N,N′-dialkyl-substituted aromatic diamines, which may optionally be substituted by alkyl radicals on the aromatic ring, said alkyl radicals having from 1 to 20, preferably 1 to 4 carbon atoms in the N-alkyl radical, such as N,N′-diethyl-, N,N′-bis[sec-pentyl], N,N′-bis[sec-hexyl]-, N,N′-bis[sec-decyl]-, N,N′-dicyclohexyl-p- or-m-phenylenediamine, N,N′-dimethyl-, N,N′diethyl-, N,N′-diisopropyl-, N,N′-bis[-sec-butyl]-, N,N′-dicyclohexyl-4,4′-diaminodiphenylmethane and N,N′-bis[sec-butyl]benzidine.

The chain extenders may be used individually or in the form of mixtures. If both aromatic diamines and chain extenders are used, then from 0.1 to 50, and more preferably from 4 to 30 parts by weight of chain extender per 100 parts by weight of the aromatic diamine is utilized.

As the preferred catalysts, those compounds are used which greatly accelerate the reaction of the hydroxyl group-containing polyols and hydroxyl group-containing optional chain extenders with the polyisocyanates. Included are organometallic compounds, preferably organic tin compounds such as tin(II) salts of organic carboxylic acids such tin(II) acetate, tin(II) octoate, tin(II) ethylhexoate and tin(II) laurate, and the dialkyl tin(IV) salts of organic carboxylic acids such as dibutyl tin diacetate, dibutyl tin dilaurate, dibutyl tin maleate and dioctyl tin diacetate. The organometallic compounds are used alone or preferably in combination with strongly basic amines, typical examples of which are amidines such as 2,3-dimethyl-3,4,5,6-tetrahydropyrimidine; tertiary amines, such as triethylamine, tributylamine, dimethylbenzylamine, N-methyl-, N-ethyl-, and N-cyclohexylmorpholine, N,N,N′,N′-tetramethylethylenediamine, N,N,N′,N′-tetramethylbutanediamine, pentamethyldiethylenetriamine, tetramethyldiaminoethyl ether, bis(dimethylaminopropyl)urea, dimethylpiperazine, 1,2-dimethylimidazole, 1-aza-bicyclo[3.3.0]octane, and preferably 1,4-diaza-bicyclo[2.2.2]octane; and alkanol compounds such as triethanolamine, triisopropanolamine, N-methyl- and N-ethyldiethanolamine, and dimethylethanolamine.

Typical catalysts are also: tris(dialkylaminoalkyl)-s-hexahydrotriazines, in particular tris (N,N-dimethylaminopropyl)-s-hexahydrotriazine; tetraalkyl ammonium hydroxides such as tetramethylammonium hydroxide, alkali hydroxides, such as sodium hydroxide and alkali alkoxides, such as sodium methoxide and potassium isopropoxide, and alkali salts of long-chain fatty acids having 10 to 20 carbon atoms and optionally side-positioned hydroxyl groups. Preferably used are from 0.001 to 5 percent by weight, more preferably 0.05 to 2 percent by weight of catalyst or catalyst combinations, based on the weight of the polyol component.

Among the blowing agents which may optionally be used in the process of the invention is water, a "reactive" blowing agent which reacts with isocyanate groups to form carbon dioxide. The amounts of water which are preferably used range from 0.5 to 2 percent by weight based on the weight of the polyol component.

Other blowing agents which may be used are low-boiling-point liquids, which vaporize as a result of the exothermic nature of the polyaddition reaction. Suitable blowing agents are those which are inert to the organic polyisocyanate and which having boiling points under 100° C. Examples of such preferably used liquids include halogenated hydrocarbons such methylene chloride, trichlorofluoro-methane, dichlorodifluoromethane, dichloromonofluoromethane, dichlorotetrafluoroethane, and 1,1,2-trichloro-1,2,2-trifluoroethane. Mixtures of these low-boiling-point liquids with one another and/or with other substituted or unsubstituted hydrocarbons may also be used as blowing agents.

The most desirable amount of low-boiling point liquid to use in preparing cellular polyurethane polyurea molded objects depends on the density which is desired as well as on whether water is also used. Generally, amounts from 0.5 to 15 parts by weight based on 100 parts by weight of the polyol component produces satisfactory results.

Auxiliaries and additives can also be incorporated in the reaction mixture. Typical examples well known to those skilled in the art are surfactants, foam stabilizers, cell regulators, fillers, colorants, pigments, flame retardants, agents to protect against hydrolysis, fungistats, and bacteriostats.

Surfactants which may be used are those compounds which are used to support the homogenation of the basic components and which may also be suitable for controlling cell structure. Typical examples are emulsifiers such as the sodium salts of castor oil sulfates or of fatty acids; salts of fatty acids with amines, for example oleic acid diethylamine or stearic acid diethanolamine; salts of sulfonic acids, for example alkali or ammonium salts of dodecylbenzene- or dinaphthylmethanedisulfonic acid; and ricinoleic acid. Foam stabilizers which may be used are, for example, siloxane oxalkylene heteropolymers and other organic polysiloxanes; oxyethylated alkyl phenols, oxyethylated fatty alcohols; paraffin oils, castor oil or ricinoleates and Turkey red oil. Examples of cell regulators which may be used are paraffins, fatty alcohols, and dimethylpolysiloxanes. The surfactants, foam stabilizers, and cell regulators are generally used in amounts ranging from 0.01 to 5 parts by weight based on 100 parts by weight of the polyol component.

The fillers which may be used, in particular reinforcing fillers, include conventional organic and inorganic fillers, reinforcing agents, weight-increasing agents, agents to improve paint wear, coating agents, etc. Typical examples are: inorganic fillers such as silicate minerals, for example lamellar silicates such as antigorite, serpentine, hornblendes, amphibole, chrysotile, talcum; metal oxides such as kaolin, aluminum oxide, titanium oxides, and iron oxides; metal salts such as chalk and barium sulfate; inorganic pigments such as cadmium sulfide and zinc sulfide; and glass, asbestos powder, etc. Preferably used are kaolin (China clay), aluminum silicate, coprecipitates of barium sulfate and aluminum silicate, and natural and synthetic fibrous minerals such as asbestos, and wollastonite. In particular, glass fibers of varying lengths, which may optionally also be treated with a size may be used. Typical organic fillers are: coal, melamine, pine resin, cyclopentadienyl resins and graft polymers based on styrene and acrylonitrile, prepared by means of in situ polymerization of acrylonitrile/styrene mixtures in polyether polyols using methods similar to those described in German Patent documents Nos. 11 11 394, 12 22 669, (U.S. Pat. Nos. 3,304,273; 3,383,351; 3,523,093), 11 52 536 (British Pat. No. 1,040,452), and 11 52 537 (British Pat. No. 987,618), and which may thereafter be aminated, as well as filler polyoxyalkylene polyols or polyamines, in which aqueous polymer dispersions are utilized to form polyoxyalkylene polyol or polyamine dispersions.

The inorganic and organic fillers can be used individually or as mixtures. Preferably used are stable filler/polyoxyalkylene polyol dispersions in which the fillers are reduced in size to less than 7 μm in situ in the presence of polyoxyalkylene polyols at high localized energy densities and which are simultaneously dispersed by this action. The inorganic and organic fillers are incorporated into the reaction mixture, preferably in amounts ranging from 0.5 to 50 weight percent, more preferably from 1 to 40 weight percent based on the weight of the isocyanate, polyol and chain extender components.

Suitable flame retardants are tricresyl phosphate, tris(2-chloroethyl)phosphate, tris(chloropropyl)phosphate, and 2,3-dibromopropylphosphate. In addition to the halogen-substituted phosphates cited above, inorganic flame retardants may also be used to make the molded object flame resistant, for example hydrated aluminum oxide, antimony trioxide, arsenic oxide, ammonium polyphosphate, and calcium sulfate. Generally, it is preferable to use from 5 to 50 parts by weight, more preferably from 5 to 25 parts by weight, of the cited flame retardants per 100 parts by weight of the polyol component.

Further information on these conventional auxiliaries and additives is found in the literature, in particular in the monograph by J. H. Sanders and K. C. Frisch, *Polyurethanes*, pt. 1 and 2, in *High Polymers* vol. XVI, Interscience Publishers 1962, 1964.

In order to prepare the optionally cellular polyurethane polyurea molded objects, the organic polyisocyanates, polyols, aromatic amines and chain extenders are reacted in such amounts that the equivalent ratio of isocyanate groups in the polyisocyanates to the sum of reactive hydrogen atoms in the polyol and chain extender components is from 1:0.85 to 1:1.25, preferably from 1:0.95 to 1:1.15.

The preparation of cellular, micro-cellular, and non-cellular polyurethane polyurea molded objects may be accomplished using a prepolymer process. Preferably, however, a one-shot process utilizing the known reaction injection molding technique is utilized. This process is described, for example, by Piechota and Röhr in *Integralschaumstoff*, Munich, Vienna: Carl-Hanser-Verlag, 1975; D. J. Prepelka and J. L. Wharton in *Journal of Cellular Plastics*, March–April 1975:87–98, and U. Knipp, *Journal of Cellular Plastics*, March–April 1973:76–84.

When using a mixing chamber with several feed nozzles, the basic components can be added individually and mixed intensively in the mixing chamber. It has proven to be particularly advantageous to use a 2-component process and to dissolve the primary aromatic diamine component and optional chain extenders in the polyol, along with any blowing agents, auxiliaries and additives to form the so-called "(A)" component. The organic polyisocyanates, modified polyisocyanates and/or isocyanate prepolymers are then used as the so-called "(B)" component. Here the advantage is that, for example, the (A) and (B) components can be stored separately and can be transported in a space-saving manner, so that they only need to be mixed together in the proper amounts for processing.

The amount of reaction mixture charged to the mold is measured out such that the resulting microcellular or noncellular molded parts have densities of from 1.0 to 1.4 g/cm$^3$, preferably from 1.0 to 1.2 g/cm$^3$, and cellular molded parts have densities of from 0.8 to 1.2 g/cm$^3$, preferably from 0.8 to 1.0 g/cm$^3$. The basic components are charged into the mold at a temperature of from 15° C. to 80° C., preferably from 20° C. to 55° C. Suitable mold temperatures are from 20° C. to 90° C., preferably from 30° C. to 75° C. The degree of compression for preparing microcellular or cellular molded parts ranges from 1.1 to 8, preferably from 2 to 8.

The dense, non-cellular or microcellular polyurethane polyurea molded objects obtained by the process of the invention are particularly suitable for use in the automobile industry, for example as bumper fascias, impact-protection molding, and body parts such as rain gutters, fenders, spoilers, and wheel well extensions. They may also be used for producing plastic housings, rollers, and shoe soles. The cellular foams are used, for example, as arm rests, head supports, and safety padding in automotive interiors as well as for motorcycle and bicycle seats and for cover layers in foam laminate applications.

EXAMPLES

In the following examples, the basic components were processed on an Elastogram Maschinenbau Puromat ® 30 high pressure metering system. The temperature of the basic components was 50° C. The metal mold had inside dimensions of 4×200×400 mm and had a temperature of 50° C. All parts in the example are parts by weight.

EXAMPLE 1

61.52 parts of a polyether polyol having a hydroxyl number of 26, which was prepared through the addition of 1,2-propylene oxide to trimethylolpropane and the subsequent addition of ethylene oxide; 15.38 parts of an aromatic polyester polyol having a hydroxyl number of 290, and a molecular weight of approximately 386 which was prepared from phthalic acid anhydride and 1,3-propane diol; 22 parts 2,4-dimethyl-6-tert-butyl-1,3-phenylenediamine; 1 part 1,4-diazabicyclo[2.2.2] octane in dipropylene glycol (33 wt. %), and 0.2 parts dibutyl tin dilaurate, were reacted with 66.5 parts of a urethane group-containing 4,4'-diphenylmethane diisocyanate having an isocyanate content of 23 weight percent, corresponding to an index of 1.05.

The following physical properties were measured on the resulting specimen boards:

| | |
|---|---|
| Density [kg/m$^3$] | 1.1 |
| Tensile strength [N/mm$^2$] | 30.6 |
| Elongation at break [%] | 254 |
| Graves tear strength [N/mm] | 88.8 |
| Shore D hardness | 66 |
| Modulus of flexural elasticity [N/mm$^2$] at 23° C. | 693 |

EXAMPLE 2

61.52 parts of a polyether polyol having a hydroxyl number of 26, which was prepared through the addition of 1,2-propylene oxide to trimethylolpropane and the subsequent addition of ethylene oxide; 15.38 parts of a polyester polyol having a hydroxyl number of 292 and a molecular weight of approximately 383, which was prepared from phthalic anhydride and ethylene glycol; 22 parts 2,4-dimethyl-6-tert-butyl-1,3-phenylenediamine; 1 part 1,4-diazabicyclo-[2.2.2] octane in dipropylene glycol (33 wt. %), and 0.2 parts dibutyl tin dilaurate, were reacted with 66.5 parts of the isocyanate of Example 1.

The following physical properties were measured on the resulting specimen boards:

| | |
|---|---|
| Density [kg/m$^3$] | 1.1 |
| Tensile strength [N/mm$^2$] | 26.9 |
| Elongation at break [%] | 262 |
| Graves tear strength [N/mm] | 72.2 |
| Shore D hardness | 67 |
| Modulus of flexural elasticity [N/mm$^2$] at 23° C. | 800 |

EXAMPLE 3

61.52 parts of a polyether polyol having a hydroxyl number of 26, which was prepared through the addition of 1,2-propylene oxide to trimethylolpropane and the subsequent addition of ethylene oxide; 15.38 parts of a polyester polyol having a hydroxyl number of 240 and a molecular weight of approximately 467, which was prepared from phthalic anhydride and ethylene glycol; 22 parts 2,4-dimethyl-6-tert-butyl-1,3-phenylenediamine; 1 part 1,4-diazabicyclo[2.2.2] octane in dipropylene glycol (33 wt. %), and 0.2 parts dibutyl tin dilaurate, were reacted with 63.9 parts of the isocyanate of Example 1.

The following physical properties were measured on the resulting specimen boards:

| | |
|---|---|
| Density [kg/m$^3$] | 1.1 |
| Tensile strength [N/mm$^2$] | 28.8 |
| Elongation at break [%] | 282 |
| Graves tear strength [N/mm] | 78.3 |
| Shore D hardness | 63 |
| Modulus of flexural elasticity [N/mm$^2$] at 23° C. | 620 |

EXAMPLE 4

67.92 parts of a polyether polyol having a hydroxyl number of 26, which was prepared through the addition of 1,2-propylene oxide to trimethylolpropane and the subsequent addition of ethylene oxide; 9 parts of a polyester polyol having a hydroxyl number of 409 and a molecular weight of approximately 274, which was prepared from phthalic anhydride and ethylene glycol; 22 parts 2,4-dimethyl-6-tert-butyl-1,3-phenylenediamine; 1 part 1,4-diazabicyclo-[2.2.2] octane in dipropylene glycol (33 wt. %), and 0.1 parts dibutyl tin dilaurate, were reacted with 64.4 parts of the isocyanate of Example 1.

The following physical properties were measured on the resulting specimen boards:

| | |
|---|---|
| Density [kg/m$^3$] | 1.1 |
| Tensile strength [N/mm$^2$] | 31.6 |
| Elongation at break [%] | 325 |
| Graves tear strength [N/mm] | 96.9 |
| Shore D hardness | 65 |
| Modulus of flexural elasticity [N/mm$^2$] at 23° C. | 685 |

COMPARISON EXAMPLE 76.9 parts of a polyether polyol having a hydroxyl number of 26, which was prepared through the addition of 1,2-propylene oxide to trimethylolpropane and the subsequent addition of ethylene oxide; 22 parts 2,4-dimethyl-6-tert-butyl-1,3-phenylenediamine; 1 part 1,4-diazabicyclo-[2.2.2] octane in dipropylene glycol (33 wt. %), and 0.1 parts dibutyl tin dilaurate, were reacted with 52.6 parts of a liquidified 4,4'-diphenylmethanediisocyanate having a diisocyanate content of 23%, corresponding to an index of 1.05.

The following physical properties were measured on the resulting specimen boards:

| | |
|---|---|
| Density [kg/m$^3$] | 1.1 |
| Tensile strength [N/mm$^2$] | 29.5 |
| Elongation at break [%] | 399 |
| Graves tear strength [N/mm] | 97.5 |
| Shore D hardness | 58 |
| Modulus of flexural elasticity [N/mm$^2$] at 23° C. | 447 |

The embodiments of the invention in which an exclusive privilege or property is claimed are defined as follows:

1. In a process for the one-shot preparation of a polyurethane polyurea polymer product which is either cellular, microcellular, or non-cellular or which comprises a cellular core and a non-cellular skin by the reaction of polyisocyanates, a polyol component, and aromatic diamines, in the presence of suitable catalysts, and optionally, blowing agents, chain extenders, additives and auxiliaries, the improvement comprising employing as the polyol component, a mixture comprising:
 (i) from 95 to 60 percent by weight of a conventional polyol selected from the group consisting of polyether polyols, hydroxyl-functional polyester polyols, polythioether polyols, hydroxyl-functional polyacetal polyols, hydroxyl-functional polycarbonate polyols, polyether polyamine polyols, polyesteramides and their mixtures, wherein said conventional polyol has a functionality of from 2 to 6 and a molecular weight of from 1000 to 8000, and
 (ii) from 5 to 40 percent by weight of an aromatic polyol selected from the group consisting of aromatic polyester polyols, aromatic-aliphatic polyester polyols, and mixtures thereof, wherein said aromatic polyol has a functionality of from 2 to 3 and a molecular weight of from 254 to 700, wherein the percents by weight of polyols (i) and (ii) are relative to the weight of the total polyol components, (i) and (ii).

2. The process of claim 1 wherein said polyurethane polyurea polymer polymer has a flexural modulus of elasticity greater than 600 N/mm$^2$.

3. The process of claim 1 wherein a mixture of from 90 to 75 percent by weight of conventional polyol (i) and from 10 to 25 percent by weight aromatic polyol (ii) are used as the polyol component.

4. The process of claim 1 wherein said aromatic polyol contains radicals derived from phthalic acid, isophthalic acid, terephthalic acid, or mixtures thereof.

5. The process of claim 2 wherein said aromatic polyol contains radicals derived from phthalic acid, isophthalic acid, terephthalic acid, or mixtures thereof.

6. The process of claim 1 wherein said aromatic polyol is a polyester derived from phthalic acid and a diol selected from the group consisting of ethylene glycol, diethylene glycol, and mixtures thereof, wherein said polyester has a molecular weight of from 254 to 700.

7. The process of claim 2 wherein said aromatic polyol is a polyester derived from phthalic acid and a diol selected from the group consisting of ethylene glycol, diethylene glycol, and mixtures thereof, wherein said polyester has a molecular weight of from 254 to 700.

8. The cellular product of the process of claim 1 wherein said product has a density of from 0.8 to 1.2 g/cm$^3$.

9. A polymer product prepared in accordance with the process of claim 1.

* * * * *

UNITED STATES PATENT AND TRADEMARK OFFICE
CERTIFICATE OF CORRECTION

PATENT NO. : 4,595,705

DATED : June 17, 1986

INVENTOR(S) : FRANK WERNER, MATTHIAS MARX, PETER HORN, HANS U. SCHMIDT

It is certified that error appears in the above-identified patent and that said Letters Patent is hereby corrected as shown below:

First page, Bibliographic Data, correct Code 30 - Foreign Application Priority Data - Feb. 17, 1984 (DE) Fed. Rep. of Germany - 3405679

Claim 2, line 2, change "polymer polymer" to "polymer product."

Signed and Sealed this

Twenty-third Day of September 1986

[SEAL]

Attest:

DONALD J. QUIGG

Attesting Officer

Commissioner of Patents and Trademarks